(12) United States Patent
Seo et al.

(10) Patent No.: US 7,342,861 B2
(45) Date of Patent: Mar. 11, 2008

(54) METHOD AND APPARATUS FOR RECORDING DATA ON AN OPTICAL RECORDING MEDIUM

(75) Inventors: Jin-gyo Seo, Gyeonggi-do (KR); Sung-ro Go, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 11/449,588

(22) Filed: Jun. 9, 2006

(65) Prior Publication Data
US 2006/0227692 A1    Oct. 12, 2006

Related U.S. Application Data

(63) Continuation of application No. 10/349,187, filed on Jan. 23, 2003, now Pat. No. 7,110,340.

(30) Foreign Application Priority Data
Mar. 18, 2002  (KR) ............... 2002-14461

(51) Int. Cl.
*G11B 7/00* (2006.01)
(52) U.S. Cl. ................ 369/59.11; 369/116
(58) Field of Classification Search ............ None
See application file for complete search history.

(56) References Cited
U.S. PATENT DOCUMENTS 5,109,373 A * 4/1992 Ohno et al. ............ 369/100
5,144,601 A   9/1992 Maeda et al.
5,856,980 A   1/1999 Doyle
6,357,045 B1  3/2002 Devaney
6,496,459 B2* 12/2002 Ueki ............... 369/47.53
6,584,054 B2  6/2003 Furukawa et al.
6,693,864 B2* 2/2004 Dekker ............ 369/53.26
6,738,339 B2  5/2004 Gyo (Continued)

FOREIGN PATENT DOCUMENTS

EP    1 058 240    12/2000

(Continued)

OTHER PUBLICATIONS

Abstracts of Japan, Shoji Mamoru, et al., "Data Recording Medium, Recording/Reproducing Apparatus, Manufacturing Apparatus, and Method for Providing Optimum Position of Mark Start and End Parts," Publ. No. 20010515, Publ. Date: Sep. 14, 2000.

(Continued)

*Primary Examiner*—Wayne Young
*Assistant Examiner*—Lixi Chow
(74) *Attorney, Agent, or Firm*—Staas & Halsey LLP

(57) ABSTRACT

An optical recording apparatus and method thereof form a mark and a space by radiating a laser signal corresponding to a recording pulse having a peak level and a bias level onto an optical recording medium. The optical recording apparatus includes a recording pulse generator to generate the recording pulse by overlapping a fine adjustment pulse with an amplitude less than the peak level and the bias level, and a laser diode to generate the laser signal according to the recording pulse.

11 Claims, 8 Drawing Sheets

U.S. PATENT DOCUMENTS

| 6,762,986 | B1 | 7/2004 | Seo |
| 2001/0007548 | A1 | 7/2001 | Toda et al. |
| 2002/0048241 | A1 | 4/2002 | Kumagai et al. |
| 2004/0032808 | A1 | 2/2004 | Ahn et al. |

FOREIGN PATENT DOCUMENTS

| EP | 1176587 A2 | 1/2002 |
| EP | 1182652 A2 | 2/2002 |
| EP | 1 339 048 | 8/2003 |
| JP | 05-120685 | 5/1993 |
| JP | 07-014165 | 1/1995 |
| JP | 07-129925 | 5/1995 |
| JP | 09-035269 | 2/1997 |
| JP | 2000-123367 | 4/2000 |
| JP | 2000-149302 | 5/2000 |
| JP | 2001-084628 | 3/2001 |
| JP | 2001-110052 | 4/2001 |
| JP | 2003-010143 | 11/2005 |
| WO | WO 99/52103 | 10/1999 |
| WO | WO 01/06500 | 1/2001 |
| WO | WO 01/86642 | 11/2001 |

OTHER PUBLICATIONS

Abstracts of Japan, Seo Jin-Gyo, Recording Pulse Control Signal Generating Method Suitable for Optical Recording Media Having Various Forms and Suitable Recording Device, Publ. No. 2001-1215, Publ. Date: Feb. 28, 2000.

Abstracts of Japan, Shoji Mamoru et al., Data Recording Medium and Recording/Reproducing Apparatus for Providing Optimum Position of Mark Start and End Parts, Publ. No. 20010403, Publ. Date: Aug. 24, 1999.

Chinese Office Action issued in corresponding Chinese Patent Application on Dec. 17, 2004.

Japanese Patent Office Communication, mail date Nov. 11, 2005.

European Search Report, mailed Nov. 24, 2006, and issued in corresponding European Patent Application No. 02258495.7-2210.

* cited by examiner

FIG. 3A  NRZI
FIG. 3B  DOMAIN
FIG. 3C  RECORDING PULSE
FIG. 3D  RECORDING PULSE
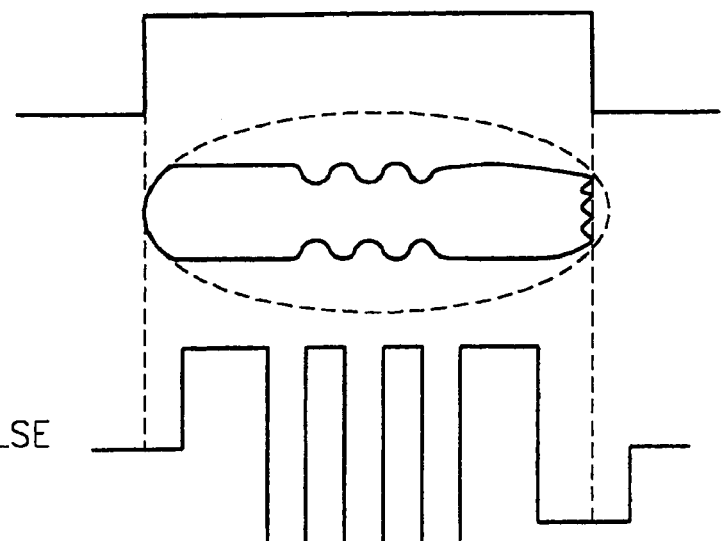

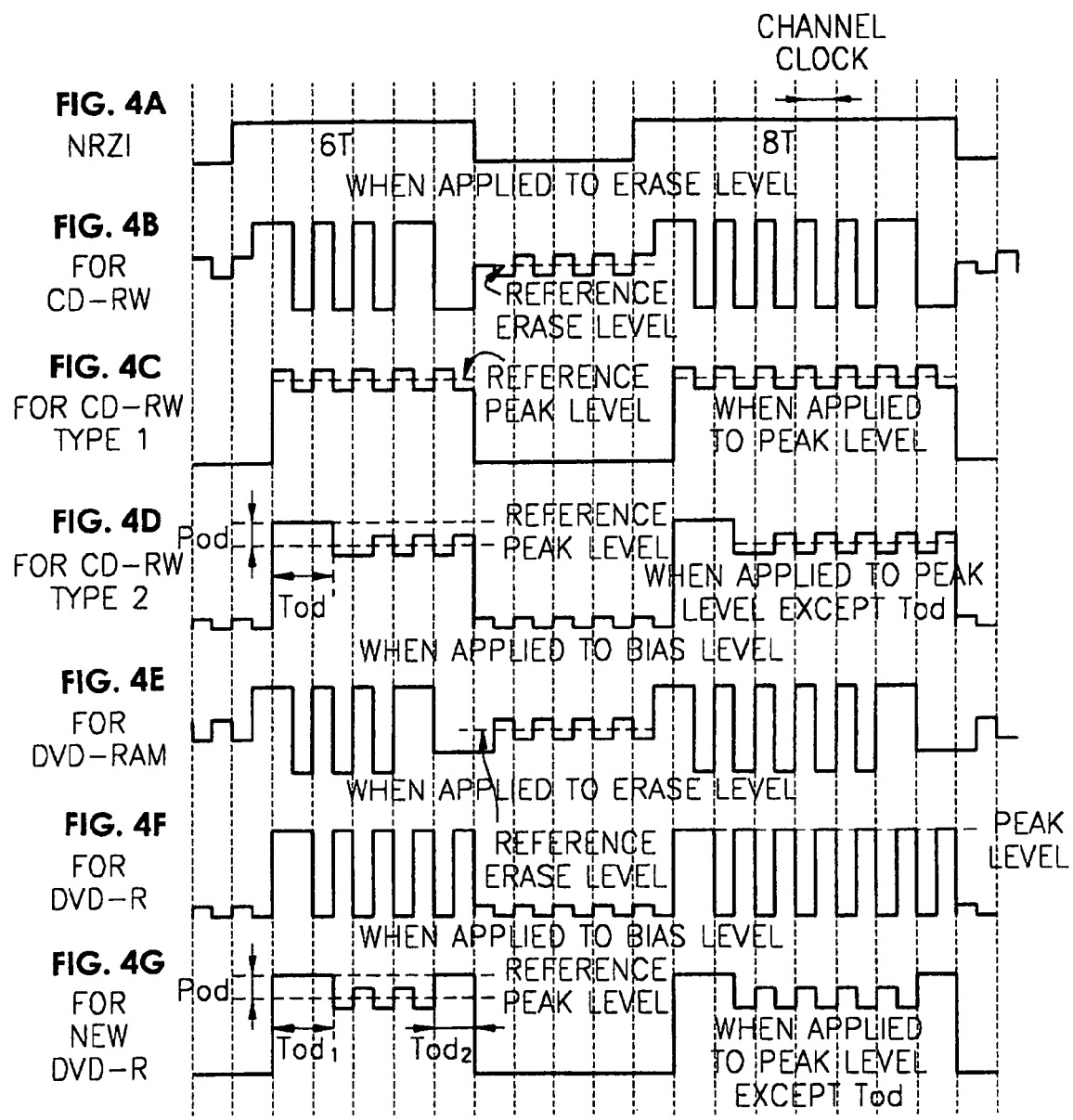

ON-START PULSE

OFF-START PULSE 1.5Tw PULSE

T

FIG. 6
FIG. 6A WHEN REFERENCE LEVEL IS USED AS CENTER
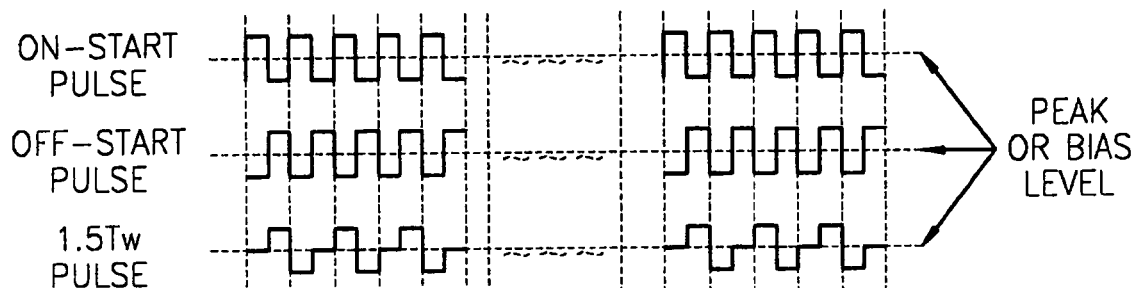
FIG. 6B WHEN REFERENCE LEVEL IS USED AS BOTTOM
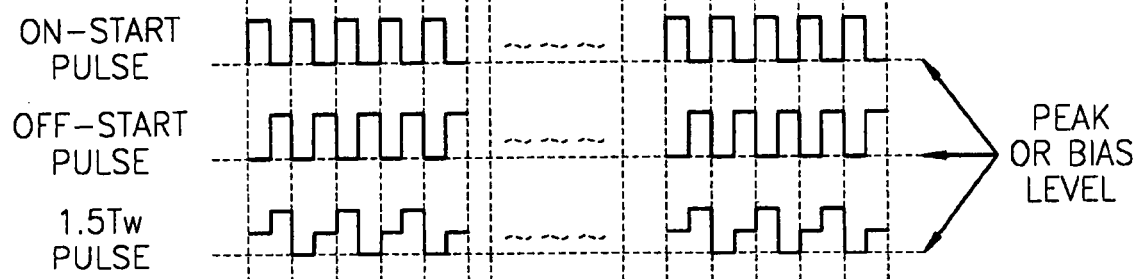
FIG. 6C WHEN REFERENCE LEVEL IS USED AS TOP
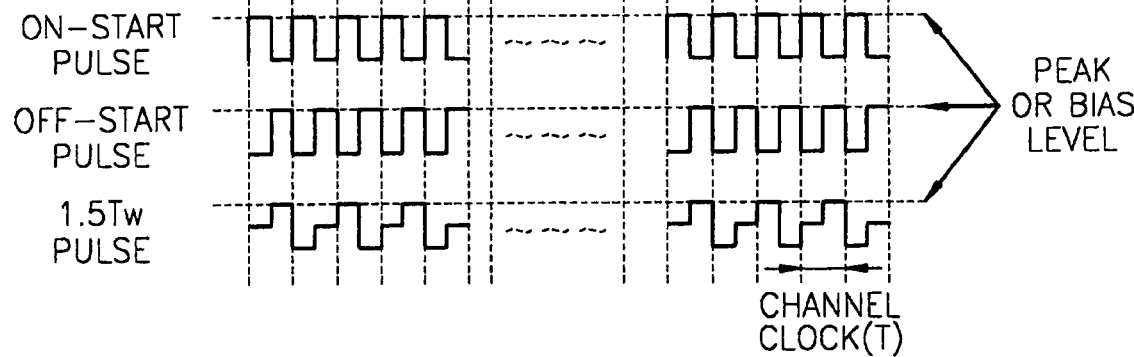

METHOD AND APPARATUS FOR RECORDING DATA ON AN OPTICAL RECORDING MEDIUM

CROSS-REFERENCE TO RELATED APPLICATIONS

This application is a Continuation of application Ser. No. 10/349,187, filed Jan. 23, 2003, now U.S. Pat. No. 7,110,340, which claims priority from Korean Patent Application No. 2002-14461, filed Mar. 18, 2002, respectively in the Korean Intellectual Property Office, the disclosure of which is incorporated herein by reference.

BACKGROUND OF THE INVENTION

1. Field of the Invention

The present invention relates to a method and apparatus for recording data on an optical recording medium, and more particularly, to an improved recording method and apparatus adapted with a high density and a high recording speed of an optical disc.

2. Description of the Related Art

Recording data on an optical disc means to form marks and spaces on a spatial track formed on the optical disc. A mark is formed as a pit in a read-only disc such as a Compact Disc-Read Only Memory (CD-ROM) and a Digital Versatile Disc-Read Only Memory (DVD-ROM). In a recordable disc such as a CD-R/RW and a DVD-R/RW/RAM, the mark is formed by radiating a laser signal on a phase-change recording film, which changes into a crystal phase or an amorphous phase according to a temperature level, or a recording film coated with an organic pigment having a light transmissivity that changes according to the temperature level.

In terms of signal detection, methods to record data on the optical disc can be divided into a mark edge recording method and a mark position recording method. According to the mark position recording method, a polarity of a detected radio frequency (RF) signal changes into an opposite polarity at a location at which the mark is recorded. According to the mark edge recording method, the polarity of the detected RF signal changes into the opposite polarity at both edges of the mark. Therefore, recording the edges of a mark is an important factor to improve a quality of a reproducing signal.

However, in the optical disc coated with the phase-change recording film, a shape of a trailing edge of the mark that is recorded, according to a conventional recording method, varies with a length of the mark or an interval between marks, i.e., a space therebetween. That is, when an interval between a trailing edge of a mark and a leading edge of the mark is large, recording and reproducing characteristics degrade. When a recording mark is relatively long, the characteristics degrade more due to thermal accumulation, which is referred to as a tear drop. The thermal accumulation influences very much a jitter characteristic of a recording signal.

In the meantime, recording the data on the optical disc is influenced by a recording speed. Nowadays, CD-Rs supporting 24× speed have appeared on the market, and DVDs supporting 4× speed are expected soon.

An increase of the recording speed means that a time taken to form marks having the same length is shortened inversely proportional to the recording speed. Accordingly, a high-power laser diode or an improved recording pulse is required.

Recording the data on the optical disc is also influenced by a high recording density. Research efforts on this topic has led to a 4.7 Gbyte HD-DVD (in case of a single layer and single surface), and 23 Gbyte HD-DVD (in case of a single layer and single surface) and a 50 Gbyte HD-DVD has also been investigated. An increase of the recording density means that a track pitch is narrowed or a minimum mark length is shortened. As a result, cross erase occurs or interference between marks increases. Consequently, a more elaborate recording control is desired.

SUMMARY OF THE INVENTION

In accordance with an aspect of the present invention, there is provided a method and apparatus for recording data using a recording waveform which is adequate for high speed and high density discs and which can suppress distortion of a recording mark so as to improve jitter characteristics.

In accordance with an aspect of the present invention, there is provided a method of forming a mark and a space by radiating a laser signal corresponding to a recording pulse having a peak level and a bias level onto an optical recording medium. The method includes forming the mark and the space using the recording pulse comprising a fine adjustment pulse with an amplitude less than the peak level; and overlapping the peak level with the fine adjustment pulse with the fine adjustment pulse.

In accordance with an aspect of the present invention, the waveform, amplitude, and period of the fine adjustment pulse are determined according to the optical recording medium.

In accordance with an aspect of the present invention, the fine adjustment pulse is overlapped except during an overdrive interval or a first pulse interval of the recording pulse.

In accordance with an aspect of the present invention, a number of pulses comprising the fine adjustment pulse is equal to or less than "n" when an interval of the peak level or the bias level is nT, wherein "n" is an integer greater than or equal to 1.

In accordance with an aspect of the present invention, there is provided a method of forming a mark and a space by radiating a laser signal corresponding to a recording pulse having a peak level and a bias level onto an optical recording medium. The method includes determining a reference level to which a fine adjustment pulse is to be applied according to the rewritable or the recordable type optical recording medium; determining an overlapping level onto which the fine adjustment pulse is to be overlapped; determining a waveform and an amplitude of the fine adjustment pulse; generating a recording pulse by overlapping the fine adjustment pulse having the determined waveform and the amplitude on the overlapping level on the basis of the reference level; and forming the mark and the space on the optical recording medium using the recording pulse.

In accordance with an aspect of the present invention, there is provided an optical recording apparatus for forming a mark and a space by radiating a laser signal corresponding to a recording pulse having a peak level and a bias level onto an optical recording medium. The optical recording apparatus includes a recording pulse generator which generates the recording pulse by overlapping a fine adjustment pulse with an amplitude less than the peak level and the bias level; and a laser diode generating the laser signal according to the recording pulse.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other aspects and advantages of the invention will become apparent and more readily appreciated from the following description of the embodiments, taken in conjunction with the accompanying drawings of which:

FIG. 3A is a diagram illustrating an NRZI signal;

FIG. 3B is a diagram illustrating a domain formed on a disc;

FIGS. 3C and 3D are diagrams illustrating a relationship between the domain formed on the disc and a recording pulse;

FIG. 4A is a diagram showing a recording pulse generated by a method to generate a recording waveform, according to an aspect of the present invention;

FIG. 4B is a diagram showing a fine adjustment pulse applied to an erase level of a CD-RW, according to an aspect of the present invention;

FIG. 4C is a diagram showing the fine adjustment pulse applied to a peak level of the CD-RW disc type 1, according to an aspect of the present invention;

FIG. 4D is a diagram showing the fine adjustment pulse applied to the peak level and a bias level of the CD-RW disc type 2, according to an aspect of the present invention;

FIG. 4E is a diagram showing the fine adjustment pulse applied to the erase level of the DVD-RAM, according to an aspect of the present invention;

FIG. 4F is a diagram showing the fine adjustment pulse applied to the bias level of the DVD-R disc, according to an aspect of the present invention;

FIG. 4G is a diagram showing the fine adjustment pulse applied to the peak level of the new DVD-R disc type, according to an aspect of the present invention;

FIG. 6A is a diagram showing a relationship between the fine adjustment pulse and the peak level used as a reference level, according to an aspect of the present invention;

FIG. 6B is a diagram showing a relationship between an overlapping level used as a bottom of the fine adjustment pulse and the reference level, according to an aspect of the present invention;

FIG. 6C is a diagram showing a relationship between the overlapping level used as a top of the fine adjustment pulse and the reference level, according to an aspect of the present invention;

DETAILED DESCRIPTION OF THE INVENTION

Figure 1:
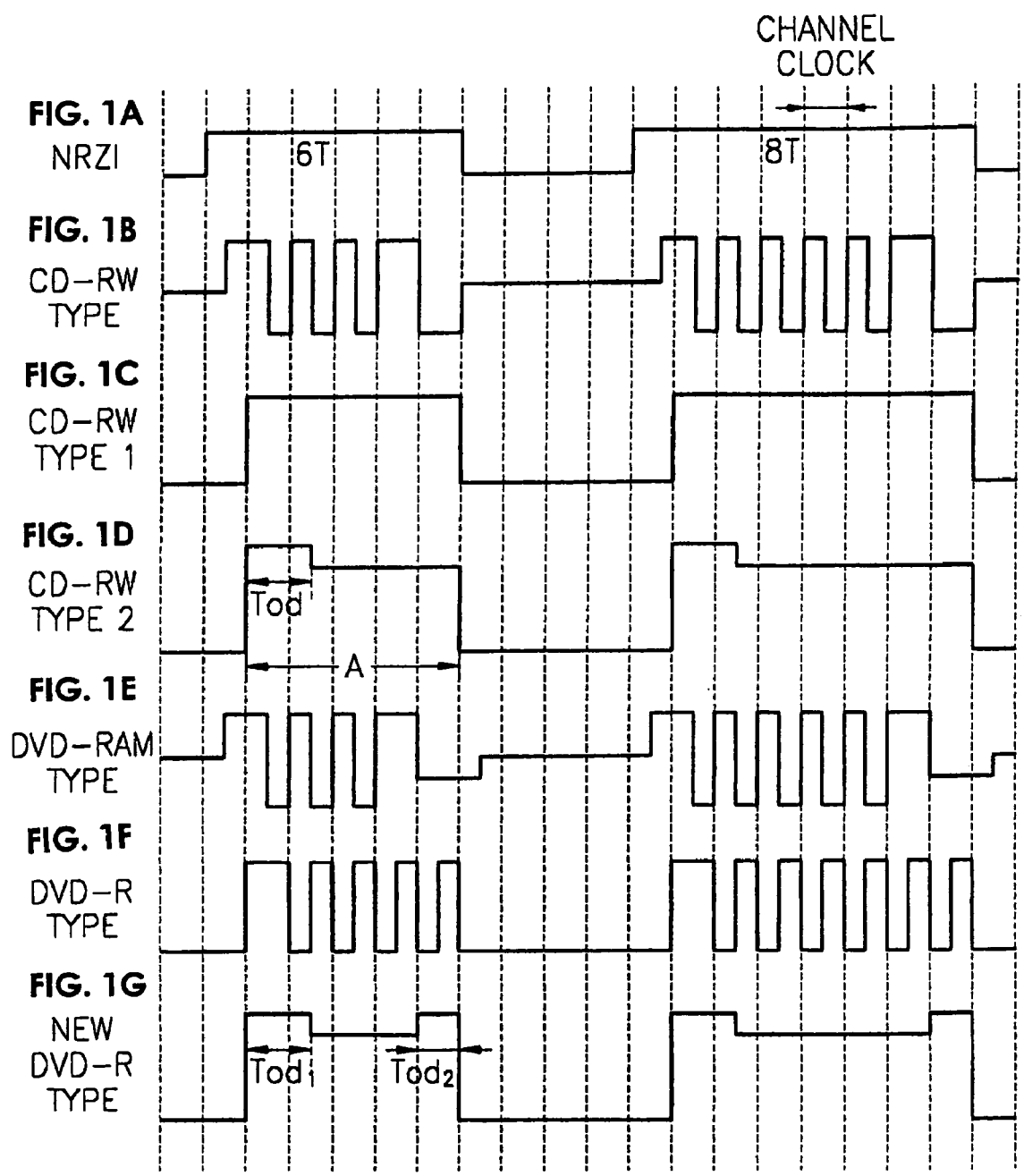
FIG. 1A is a diagram illustrating 6T and 8T Non-Return to Zero Inverted (NRZI) data.
FIG. 1B is a diagram illustrating a recording pulse used to record the 6T and 8T NRZI data for a CD-RW disc type (phase-change disc)
FIG. 1C is a diagram illustrating the recording pulse used to record the 6T and 8T NRZI data for a CD-RW disc type 1.
FIG. 1D is a diagram illustrating the recording pulse used to record the 6T and 8T NRZI data for a CD-RW disc type 2.
FIG. 1E is a diagram illustrating the recording pulse used to record the 6T and 8T NRZI data for a Digital Versatile Disc-Random Access Memory (DVD-RAM) disc type.
FIG. 1F is a diagram illustrating the recording pulse used to record the 6T and 8T NRZI data for a DVD-R disc type.
FIG. 1G is a diagram illustrating the recording pulse used to record the 6T and 8T NRZI data for a new DVD-R disc type.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1A is a diagram illustrating 6T and 8T Non-Return to Zero Inverted (NRZI) data. FIG. 1B is a diagram illustrating a recording pulse used to record the 6T and 8T NRZI data for a CD-RW disc type (phase-change disc). FIG. 1C is a diagram illustrating the recording pulse used to record the 6T and 8T NRZI data for a CD-RW disc type 1. FIG. 1D is a diagram illustrating the recording pulse used to record the 6T and 8T NRZI data for a CD-RW disc type 2. FIG. 1E is a diagram illustrating the recording pulse used to record the 6T and 8T NRZI data for a Digital Versatile Disc-Random Access Memory (DVD-RAM) disc type. FIG. 1F is a diagram illustrating the recording pulse used to record the 6T and 8T NRZI data for a DVD-R disc type. FIG. 1G is a diagram illustrating the recording pulse used to record the 6T and 8T NRZI data for a new DVD-RAM disc type. Here, T indicates the period of a reference clock.

As shown in FIG. 1D, the CD-RW disc type 2 has an overdrive interval (Toverdrive: Tod) compared to the CD-RW disc type 1. The Tod changes a little above or below 1.5T and has a level changing about 20% above or below a peak level. As shown in FIG. 1G, the new DVD-R type has two overdrive intervals Tod1 and Tod2.

According to a mark edge recording method, a high level of the NRZI data is recorded as a mark and a low level thereof is formed as a space. In order to form a domain (which is a concept corresponding to the mark and is an area in which a crystal phase is formed on a phase-change optical disc) on the phase-change optical disc, a multi-pulse is used, as shown in an interval A of the waveform shown in FIG. 1E. Here, a power level of the multi-pulse is adjusted to one of four levels, i.e., Ppeak, Pb1, Pb2, and Pb3.

The multi-pulse is used for the phase-change optical disc to prevent a domain from being distorted in a radial or tangential direction of the disc due to thermal accumulation.

In order to form the domain in an organic pigment optical disc, a single pulse is used, as shown in the interval A of the waveform shown in FIG. 1D. A power level of the single pulse is adjusted to one of three levels, i.e., Powerdrive, Ppeak, and Pbias.

However, as time taken to form a recording mark is shortened with an increase in a recording speed, a single pulse may be used for the phase-change optical disc, similar to the organic pigment optical disc.

Figure 2:
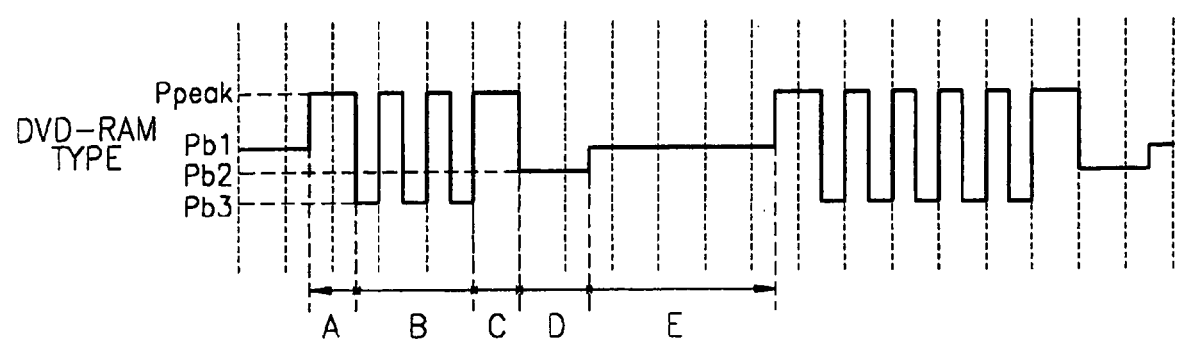
FIG. 2 is a detailed diagram to record pulses used to record data on the DVD-RAM.

FIG. 2 is a detailed diagram of recording pulses used to record data on the DVD-RAM. According to a 2.6 Gbyte DVD-RAM standard, a recording pulse to form the mark includes a first pulse, a multi-pulse chain, a last pulse, and a cooling pulse. According to a length of the recording mark, a number of pulses in the multi-pulse chain changes while first and last pulses are maintained. The power level of the recording pulse changes among four levels, i.e., a peak (Ppeak), a power of bias1 or erase (Pb1), a power of bias2 or cooling (Pb2), and a power of bias3 or bottom (Pb3).

The first pulse corresponding to the interval A shown in FIG. 2 is provided to form a leading edge of a recording mark. The first pulse has the Ppeak level. The Ppeak level corresponds to the power of a laser signal to form a proper temperature to convert a phase-change recording film to a liquid phase. An interval in which the first pulse is applied is denoted by Ttop.

The multi-pulse chain corresponding to the interval B shown in FIG. 2 is inserted between the first pulse and the last pulse. The multi-pulse chain is provided to reduce non-uniformity caused by thermal accumulation in the mark and includes a plurality of pulses. The number of plurality of pulses varies with the length of the mark. The multi-pulse chain has the Ppeak level and the Pb3 level (or the bottom level). The Pb3 level corresponds to a power of a laser signal to form a proper temperature to convert the phase-change recording film to a crystal phase and is similar to a reproducing power level of a typical laser signal or lower.

The last pulse corresponding to the interval C shown in FIG. 2 is provided to form a trailing edge of the recording mark. Like the first pulse, the last pulse has the Ppeak level.

A cooling pulse corresponding to the interval D shown in FIG. 2 follows the last pulse and is provided to prevent the recording mark from becoming too long. The cooling pulse has the Pb2 level (or the cooling level). The Pb2 level is set between the Pb1 level and the Pb3 level.

An erase pulse corresponding to the interval E shown in FIG. 2 is provided to form a space. The erase pulse has the Pb1 level. The Pb1 level corresponds to the power of the laser signal to form a proper temperature to convert the phase-change recording film into an amorphous state.

FIGS. 3A to 3D are diagrams illustrating a relationship between a domain formed on a disc and a recording pulse. Specifically, FIG. 3A is a diagram illustrating an NRZI signal. FIG. 3B is a diagram illustrating a domain formed on a disc. FIGS. 3C and 3D are diagrams illustrating a relationship between the domain formed on the disc and a recording pulse.

Digital information is recorded on the phase-change optical disc according to a crystal/amorphous phase of the recording film. A laser diode is used to apply heat. The recording film is converted to an amorphous phase (or an erase phase) at about 300° C. and to a liquid phase at about 600° C.

Usually, when the temperature of a recording film is about 300° C., the recording film is converted to an erase phase in which the recorded information is erased. When the temperature of the recording film increases to 600° C. or over, the recording film is converted into a complete liquid phase. In the liquid phase, if the recording film is rapidly cooled, the recording film is converted to a crystal phase. With the changing crystal and amorphous phases of the recording film, desired digital information can be recorded.

Cooling may performed by rapidly lowering the power of the laser beam in case of a 4.7 Gbyte DVD-RAM or by cutting off the power of the laser beam in case of a 2.6 Gbyte DVD-RAM. Here, a recording film is spontaneously cooled through a substrate supporting the recording film.

By applying an intermittent recording pulse, as shown in FIG. 3C, to the phase-change optical disc, a smooth domain can be obtained, as defined by the solid line in FIG. 3B. In other words, the thermal accumulation is restrained by intermittently applying the laser signal having the Ppeak level to the body portion of the domain so that the domain is prevented from widening.

If the recording pulse shown in FIG. 3D is applied to the phase-change optical disc, a distorted domain is obtained, as defined by the dotted line in FIG. 3B, due to the thermal accumulation. The domain defined by the dotted line in FIG. 3B causes cross-talk between adjacent tracks or jitter between adjacent marks to occur.

Because the organic pigment optical disc requires higher recording power than the phase-change optical disc, the recording pulse shown in FIG. 3D is used.

However, with an increase of integration density and recording speed, it is difficult to obtain satisfactory recording quality with conventional recording pulses. As the integration density increases, a minimum recording length is shortened. As the recording speed increases, the time to form marks having the same length is shortened. In other words, when the integration density or the recording speed increases, a clock period is shortened, and the length (in terms of time) of a multi-pulse having a functional relation to a clock period T is shortened as well. Consequently, a single pulse is used rather than the multi-pulse. The single pulse may be used instead of the multi-pulse for the DVD-R disc type shown in FIG. 1F. Similar problems occur in the organic pigment optical disc using the single pulse. In other words, because the laser signal cannot be intermittently applied when the single pulse is used, a teardrop phenomenon occurs, in which the domain defined by the dotted line in FIG. 3B is formed.

To overcome the teardrop phenomenon, a recording method, according to an aspect of the present invention, uses a recording pulse in which a number of fine adjustment pulses are applied to a peak level or a bias level. The number of fine adjustment pulses is determined in accordance with the length of the mark to be recorded.

A waveform, an amplitude, and a period of the fine adjustment pulse vary with the media type. A top level, a center level, and a bottom level of the fine adjustment pulse can be adjusted with reference to a reference level. The reference level may be the peak level or the bias level. The bias level may be a bias1 level (an erase level), a bias2 level (a cooling level), or a bias3 level (a bottom level).

When the fine adjustment pulse is applied to the peak level, the power of the laser signal slightly changes according to the amplitude, the waveform, and the period of the fine adjustment pulse in a body portion of the domain, thereby preventing the thermal accumulation. Accordingly, a smooth domain can be formed. Consequently, interference between adjacent tracks is decreased.

When the fine adjustment pulse is applied to the erase level, the power of the laser signal slightly changes according to the amplitude, the waveform, and the period of the fine adjustment pulse at the domain to be erased, thereby preventing the thermal accumulation. Accordingly, the trace of erasure is prevented from remaining in the area of the erased domain. As a result, re-recording can be easily performed, thereby increasing recording quality, and a number of re-recordings increases.

FIGS. 4A to 4G are diagrams showing examples of recording pulses generated by a method of generating the recording waveform according to an aspect of the present invention. Specifically, FIG. 4A is a diagram showing a recording pulse generated by a method to generate a recording waveform, according to an aspect of the present invention. FIG. 4B is a diagram showing the fine adjustment pulse applied to an erase level of a CD-RW, according to an aspect of the present invention. FIG. 4C is a diagram showing the fine adjustment pulse applied to a peak level of the CD-RW disc type 1, according to an aspect of the present invention. FIG. 4D is a diagram showing the fine adjustment pulse applied to the peak level and a bias level of the CD-RW disc type 2, according to an aspect of the present invention.

FIG. 4E is a diagram showing the fine adjustment pulse applied to the erase level of the DVD-RAM, according to an aspect of the present invention. FIG. 4F is a diagram showing the fine adjustment pulse applied to the bias level of the DVD-RAM disc, according to an aspect of the present invention. FIG. 4G is a diagram showing the fine adjustment pulse applied to the peak level of the new DVD-RAM disc type, according to an aspect of the present invention.

In the waveform shown in FIG. 4B, the fine adjustment pulse is overlapped on the erase level (Pb1 level) unlike the waveform shown in FIG. 1B. Here, an amplitude of the fine adjustment pulse is lower than the peak level (Ppeak level), and the period thereof is 1T. In addition, the number of pulses constituting the fine adjustment pulse is "n" (which is an integer greater than or equal to 1) when the length of an interval in which the erase level is applied is nT.

In the waveform shown in FIG. 4C, the fine adjustment pulse is overlapped on the peak level unlike the waveform shown in FIG. 1C. Here, the amplitude of the fine adjustment pulse is lower than the peak level, and the period thereof is 1T. In addition, the number of pulses constituting the fine adjustment pulse is "n" when the length of an interval in which the peak level is applied is nT.

In the waveform shown in FIG. 4D, a fine adjustment pulse is overlapped on the peak level and the bias level (Pb level) unlike the waveform shown in FIG. 1D. Here, the amplitude of the fine adjustment pulse is lower than the peak level, and the period thereof is 1T. In addition, even if the fine adjustment pulse is overlapped on the peak level (Ppeak level), a maximum value of the fine adjustment pulse is lower than an overdrive level Pod. The fine adjustment pulse is applied to the peak level except during an overdrive interval Tod. The number of pulses constituting the fine adjustment pulse is "n" when the length of an interval in which the erase level is applied is nT. In an interval in which the bias level (Pb2 level) is applied, only a top portion of the fine adjustment pulse is shown because the bias level (Pb level) that is a reference level is set as a center level of the fine adjustment pulse. Just as the fine adjustment pulse is applied to the peak level except the overdrive interval Tod in the waveform shown in FIG. 4D, the fine adjustment pulse may be overlapped on the peak level and the fine adjustment pulse is not applied in the first pulse interval in the CD-RW.

In the waveform shown in FIG. 4E, the fine adjustment pulse is overlapped on the erase level unlike the waveform shown in FIG. 1E. Here, the amplitude of the fine adjustment pulse is lower than the peak level, and the period thereof is 1T. In addition, the number of pulses constituting the fine adjustment pulse is "n" when the length of an interval in which the erase level is applied is nT.

In the waveform shown in FIG. 4F, the fine adjustment pulse is overlapped on the peak level and the bias level (Pb level) unlike the waveform shown in FIG. 1F. Here, the amplitude of the fine adjustment pulse is lower than the peak level, and the period thereof is 1T. In an interval in which the bias level (Pb2 level) is applied, only a top portion of the fine adjustment pulse is shown because the bias level (Pb level), which is a reference level, is set as a center level of the fine adjustment pulse. The number of pulses constituting the fine adjustment pulse is "n" when the length of an interval in which the bias level (Pb2 level) is applied is nT.

In the waveform shown in FIG. 4G, the fine adjustment pulse is overlapped on the peak level and the bias level (Pb level) unlike the waveform shown in FIG. 1G. Here, the amplitude of the fine adjustment pulse is lower than the peak level, and the period thereof is 1T. In addition, even if the fine adjustment pulse is overlapped on the peak level (Pb level), the maximum value of the fine adjustment pulse is lower than the overdrive level Pod. The fine adjustment pulse is applied to the peak level except overdrive intervals Tod1 and Tod2. The number of pulses constituting the fine adjustment pulse is less than "n" when the length of an interval in which the peak level is applied is nT.

Figure 5A:
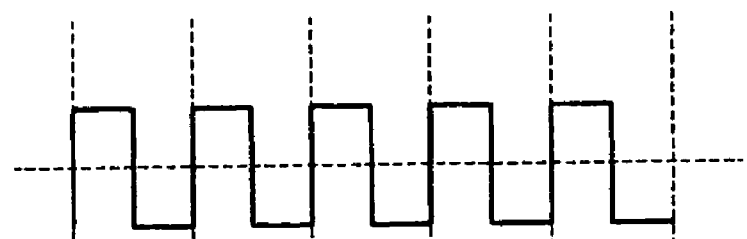
FIG. 5A is a diagram showing fine adjustment pulses divided into on-start types, according to an aspect of the present invention.
Figure 5B:
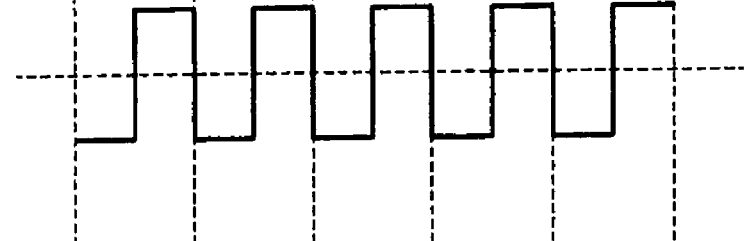
FIG. 5B is a diagram showing the fine adjustment pulses divided into on-start types, according to an aspect of the present invention.
Figure 5C:
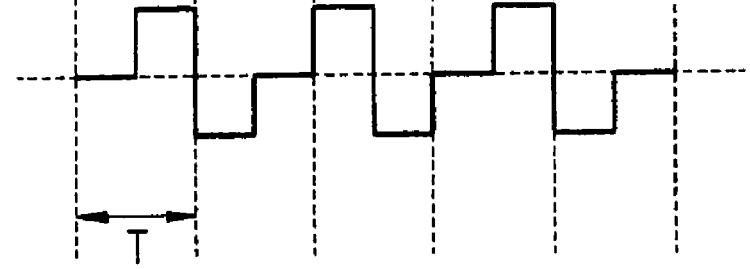
FIG. 5C is a diagram showing the fine adjustment pulses divided into 1.5Tw types, according to an aspect of the present invention.

FIGS. 5A through 5C are diagrams showing examples of waveforms of fine adjustment pulses according to the present invention. Referring to FIGS. 5A through 5C, the fine adjustment pulses are divided into on-start types, off-start types, and 1.5Tw types, respectively. An on-start type is a binary pulse having a positive leading pulse. An off-start type is a binary pulse having a negative leading pulse. A 1.5Tw type is a trinary pulse having a period of 1.5T. The on-start type can be applied to media for which the peak level must be applied to a leading edge. The off-start type can be applied to media for which the peak level must be applied some time after the leading edge. Accordingly, the waveform of a fine adjustment pulse is determined according to the media type.

FIGS. 6A through 6C are diagrams showing relationships between a fine adjustment pulse and a reference level according to an aspect of the present invention. Specifically, FIG. 6A is a diagram showing a relationship between the fine adjustment pulse and the peak level used as a reference level, according to an aspect of the present invention. FIG. 6B is a diagram showing a relationship between an overlapping level used as a bottom of the fine adjustment pulse and the reference level, according to an aspect of the present invention. FIG. 6C is a diagram showing a relationship between the overlapping level used as a top of the fine adjustment pulse and the reference level, according to an aspect of the present invention.

Here, the overlapping level is a level onto which the fine adjustment pulse is overlapped, and corresponds to one of a center, top, and bottom of the fine adjustment pulse. For example, if the overlapping level corresponds to the center, the center level of the fine adjustment pulse is equal to the reference level.

Figure 7:
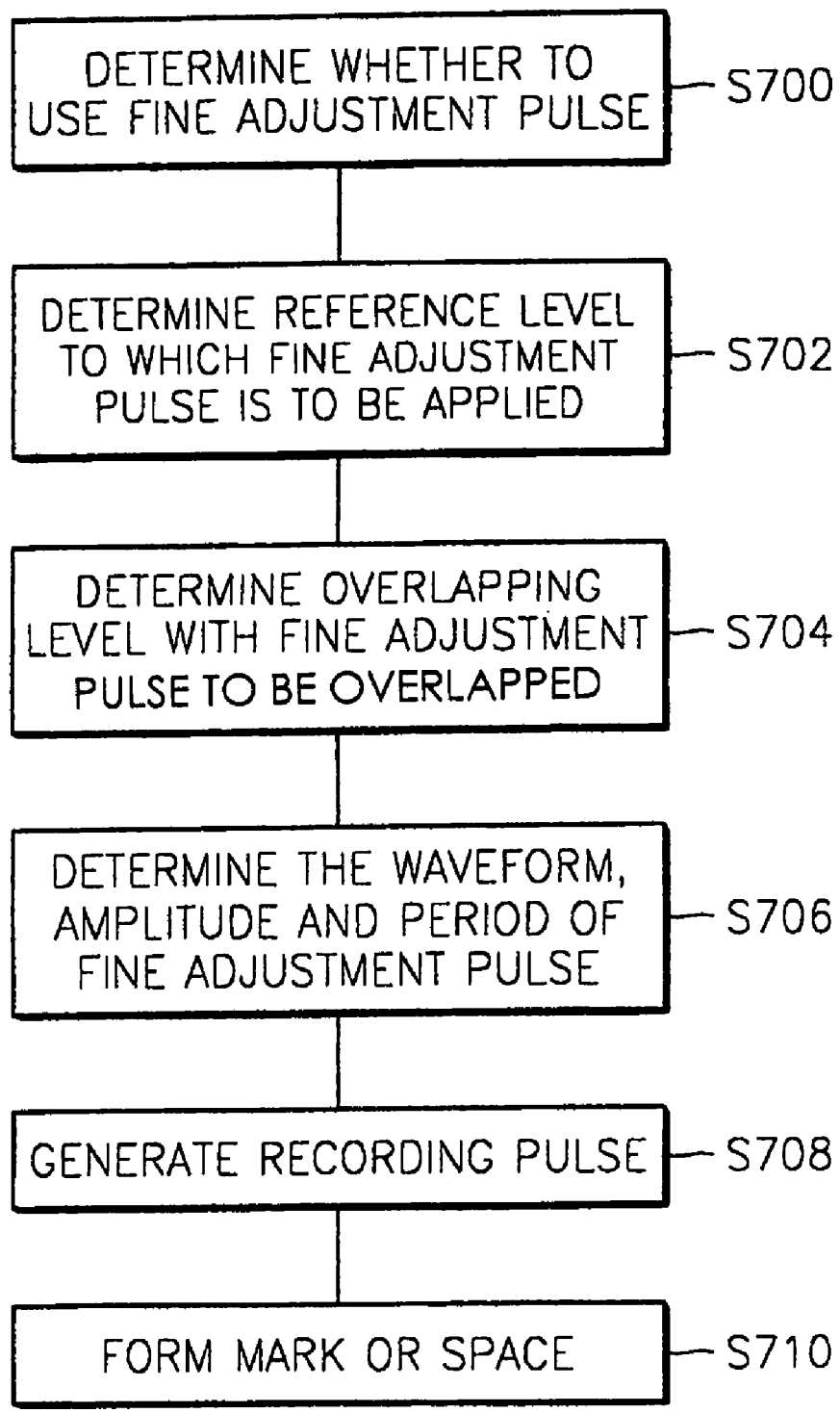
FIG. 7 is a flowchart of a recording method, according to an aspect of the present invention.

FIG. 7 is a flowchart of a recording method according to an aspect of the present invention. At operation S700, the method determines whether to use the fine adjustment pulse. If it is determined to use the fine adjustment pulse, at operation S702, the reference level to which the fine adjustment pulse is to be applied is determined according to the media type (i.e., a rewritable or recordable type). The reference level is the peak level or the bias level. For instance, the bias level is the erase level or the bottom level. Next, at operation S704, a level (the overlapping level) onto which the fine adjustment pulse is to be overlapped is determined. Next, at operation S706, the waveform, the amplitude, and the period of the fine adjustment pulse are determined. Next, at operation S708 a recording pulse is generated based on the reference level, the overlapping level, and the waveform that were determined in operations S702 through S706. Next, at operation S710, a mark or space is formed using the recording pulse including the fine adjustment pulse.

Figure 8:
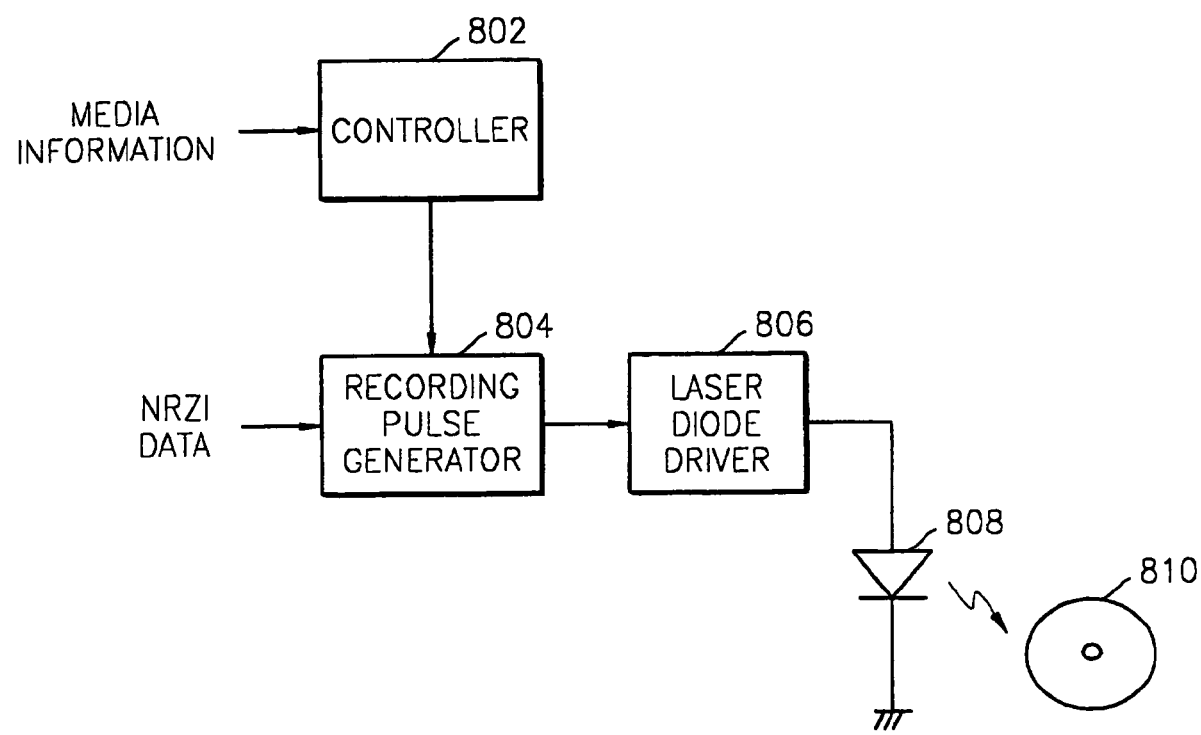
FIG. 8 is a block diagram of a recording apparatus, according to an aspect of the present invention.

FIG. 8 is a block diagram of a recording apparatus according to an aspect of the present invention. Referring to FIG. 8, the recording apparatus includes a controller 802, a recording pulse generator 804, a laser diode driver 806, and a laser diode 808. In the recording apparatus shown in FIG. 8, devices that are not related to the recording pulse are omitted to simplify the description. The devices include a servo controller to control tracking and focusing and an optical pickup driven by the servo controller and provided with the laser diode 808. These devices are well known to those skilled in the art.

The recording film characteristics and heat transmission characteristics of the media are different depending on the media manufacturers. It is difficult for the recording apparatus to research the media characteristics and appropriately control recording characteristics to the media characteristics. Accordingly, each manufacturer records media information in a lead-in area or lead-out area of a disc.

If an optical disc 810 is loaded in the recording apparatus, the recording apparatus reads media information recorded in a lead-in area or lead-out area of the optical disc 810 in order to find out the media type and the power levels appropriate with the media. The media information is provided to the controller 802.

The controller 802 controls recording pulse generation performed by the recording pulse generator 804 according to the method shown in FIG. 7. Particularly, the controller 802 applies control commands to control the waveform of the fine adjustment pulse, the overlapping level, and the reference level to the recording pulse generator 804.

More specifically, the controller 802 receives the media information from, for example, a microprocessor controlling the recording apparatus and determines the reference level to which the fine adjustment pulse is to be applied, the overlapping level onto which the fine adjustment pulse is to be overlapped, and the waveform, the amplitude, and the period of the fine adjustment pulse according to the media type. The controller 802 generates the control commands to transmit the determined reference level, the overlapping level, the waveform, the amplitude and the period to the recording pulse generator 804.

The recording pulse generator 804 generates a recording pulse which is proper to the loaded optical disc 810, as shown in FIG. 5, according to the NRZI data and the control commands of the controller 802. Here, the data applied to the recording pulse generator 804 complies with a modulation mode used in the recording apparatus. The data may be the NRZI data or run length limited (RLL) data.

The recording pulse generated by the recording pulse generator is input to the laser diode driver 806. The laser diode driver 806 controls the laser diode 808 to output a laser signal corresponding to the recording pulse. The laser signal generated from the laser diode 808 is radiated on the optical disc 810 and forms the mark and the space corresponding to the NRZI data.

According to a recording method of the present invention, a fine adjustment pulse is applied to a peak level or a bias level, thereby suppressing a distortion of marks due to thermal interference between adjacent marks and thermal accumulation during recording.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of forming a mark and a space by radiating a laser signal corresponding to a recording pulse train having a peak level pulse and a bias level pulse onto an optical recording medium, the method comprising:
    forming the mark and the space using the recording pulse train comprising a fine adjustment pulse, the fine adjustment pulse having an alternating amplitude substantially less than an amplitude defined by a difference between an amplitude of the peak level pulse and an amplitude of the bias level pulse; and
    overlapping the peak level pulse with the fine adjustment pulse.

2. The method of claim 1, wherein the fine adjustment pulse is overlapped on the peak level pulse except during an overdrive interval or a first pulse interval of the recording pulse.

3. The method of claim 1, wherein a number of pulses making up the fine adjustment pulse is equal to or less than "n" when an interval of the peak level pulse or the bias level pulse is nT, wherein "n" is an integer greater than or equal to 1.

4. The method of claim 1, wherein the fine adjustment pulse is overlapped with the bias level pulse.

5. The method of claim 1, further comprising:
    forming a domain, which is an area in which a crystal phase is formed on a phase-change optical disc, using multi pulses, in addition to fine adjustment pulses, to prevent the domain from being distorted in a radial or tangential direction of the disc due to thermal accumulation.

6. The method of claim 1, further comprising:
    forming a domain, which is an area in which a crystal phase is formed on an organic pigment optical disc, using a single pulse and at least one fine adjustment pulse.

7. The method of claim 1, wherein a number of fine adjustment pulses, in the recording pulse, are applied to the peak level pulse or the bias level pulse, wherein the number of fine adjustment pulses is determined based on a length of the mark to be recorded.

8. The method as recited in claim 1, wherein the bias level pulse is at an erase level or a bottom level.

9. The method of claim 1, wherein the fine adjustment pulse is applied to the peak level pulse or the bias level pulse to suppress a distortion of the mark due to thermal interference between adjacent marks and thermal accumulation during recording.

10. An optical recording apparatus of forming a mark and a space by radiating a laser signal corresponding to a recording pulse train having a peak level pulse and a bias level pulse onto an optical recording medium, the optical recording apparatus comprising:
    a recording pulse generator generating the recording pulse train by overlapping a fine adjustment pulse over the peak level pulse and/or the bias level pulse, the fine adjustment pulse having an alternating amplitude substantially less than an amplitude defined by a difference between an amplitude of the peak level pulse and an amplitude of the bias level pulse; and a laser diode which generates the laser signal based on the recording pulse train.

11. The apparatus of claim 10, wherein the recording apparatus reads media information recorded in a lead-in area or lead-out area of the optical recording medium to determine a media type and a power level of the optical recording medium.

* * * * *